Jan. 7, 1941.  M. G. CROSBY  2,227,824

CRYSTAL FILTER

Original Filed Feb. 10, 1937

INVENTOR.
MURRAY G. CROSBY
BY
ATTORNEY.

Patented Jan. 7, 1941

2,227,824

UNITED STATES PATENT OFFICE 2,227,824

CRYSTAL FILTER

Murray G. Crosby, Riverhead, N. Y., assignor to Radio Corporation of America, a corporation of Delaware Original application February 10, 1937, Serial No. 124,967. Divided and this application August 16, 1938, Serial No. 225,097

3 Claims. (Cl. 178—44)

The present invention concerns a novel method of and means for filtering wave energy and is a division of my United States application #124,967 filed February 10, 1937. The crystal filter of the present invention is of wide use in the radio art. A particular use is in systems for receiving wave energy modulated in phase at signal frequency as disclosed in the said parent application.

Figure 1:
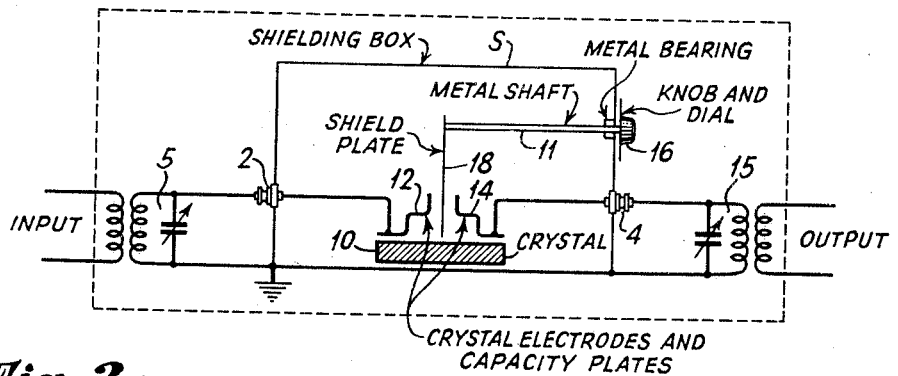

In describing my novel invention in detail, reference will be made to the attached drawing, wherein:

Figure 1 illustrates a filter of the neutralized type which may be adjusted for any desired degree of neutralization, or off-neutralization; while Figures 2, 3a, 3b, and 3c are curves illustrating the characteristics of the filter circuits of Figure 1.

The novel filter of Figure 1 may be used to obtain various filtering effects for various uses in the radio art. For example, the filter may be exactly neutralized to obtain a symmetrical characteristic. A particular use is where the crystal filter is over or under neutralized to obtain side band reversing or side band attenuating with or without a sloping filter effect as described in my United States Patent #2,085,008, dated June 29, 1937, and my United States application #124,967, filed February 10, 1937. This filter comprises as shown in Figure 1, a shielding box S enclosing a piezo-electric crystal 10, capacity members and crystal electrodes 12 and 14, and a movable shield member 18 supported on a movable member 11 which may be a shaft mounted in the shield S and controlled by a member 16. The input is between 2 and the shield S while the output is between 4 and the shield S. That is, the wave energy to be filtered is impressed at the point marked input and wave energy is derived from the point marked output. The input energy is impressed on tuned circuit 5 and from thence to contact 2 and the common electrode formed by shield S. Vibrations are produced in the piezoelectric crystal 10 and may be taken from the output electrode 14 and supplied to contact 4 and tuned circuit 15 for use.

The device of the attached Figure 1 is a crystal filter of the shielded type which may be adjusted to have the same type of characteristics as the slightly-neutralized type of crystal filter. The shielding takes the place of the neutralization. Hence by varying the shielding, the effect is the same as though the neutralization were varied. That is, the shielded crystal holder of Figure 1 has a grounded shield plate 18 between the crystal electrodes and is carefully constructed so that the capacity of the crystal holder may be completely shielded out. In order to make possible a variability of the shielding effect, the metal shield plate 18 placed between the crystal electrodes is mounted on a rotatable shaft 11 conductively connected to the shield so that the plate may be moved out from between the electrodes 12 and 14. The electrodes are bent to such a shape that a relatively large amount of capacity will be obtained between the crystal electrodes when the shield plate is removed: this insures that a capacity will be present to cause under-neutralization when the shield plate is moved away. Thus by rotating the knob 16 on the shaft where the shield plate is mounted, the crystal filter characteristic may be changed from the completely shielded or neutralized characteristic of Figure 2 (see also Figure 1 in United States Patent #2,085,008, dated June 29, 1937), to the slightly-neutralized type of characteristic similar to Figure 3c (see also Figure 2 of United States Patent #2,085,008, dated June 29, 1937), but with the dip outside of the side band channel. Consequently this type of filter is also capable of the adjustment which produces either the single function of attenuating the side bands or the dual function of attenuating the side bands and effecting the sloping filter.

Figure 3A:
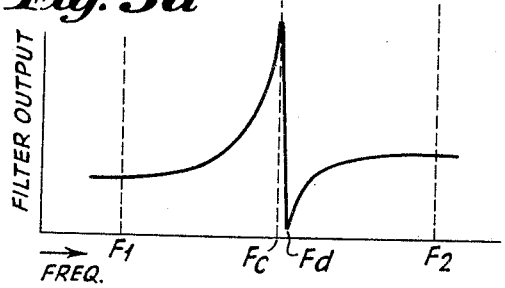
Figure 2:
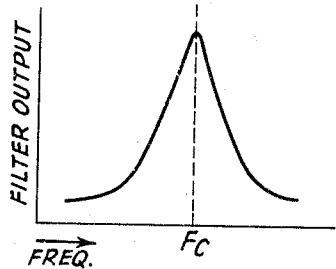
Figure 3B:
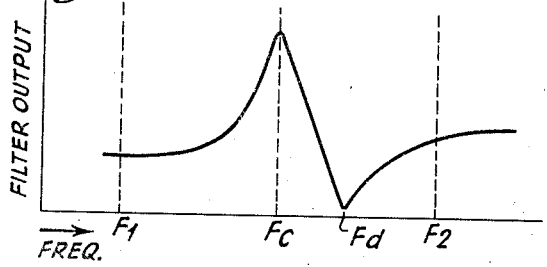
Figure 3C:
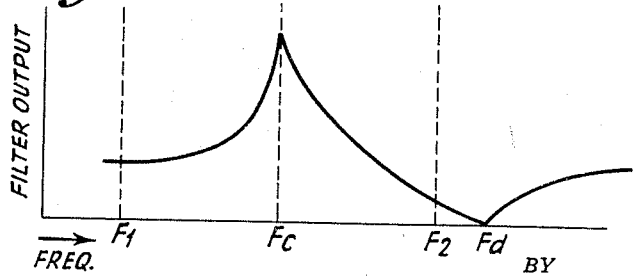

In order to clearly disclose the operation of the filter further description of what takes place when the crystal filter is off-neutralized or off-shielded will now be given. Reference will be made to Figures 3a, 3b, and 3c which helps to explain the operation of the filter. The curve of Figure 3a shows the characteristic of a crystal filter which is un-neutralized. At series resonance of the crystal to the frequency of the wave being filtered a high output is obtained at the carrier frequency, Fc. At parallel resonance, at the wave frequency, obtained by the inductive effect of the crystal and the capacity of the crystal holder, the filter output has a dip at the frequency $F_d$. This dip point may be moved farther away from the carrier frequency, as shown in the curve of Figure 3b, by moving the shielding member 18 towards the completely shielded point. By a further increase in the degree of neutralization or shielding, the dip point $F_d$ may be moved completely out of the working channel (the working channel is between the frequencies $F_1$ and $F_2$) as shown in the curve of Figure 3c. From a study of Figure 3c, it can be seen that the effect of placing this dip point just outside of the working channel is to lower the output of the filter on one side of the carrier frequency with respect to that on the other side of the carrier frequency.

I claim:

1. A filter circuit comprising a shield member, a piezo-electric crystal located in said shield member, said shield member serving as an electrode for said crystal, a pair of combined crystal electrodes and condenser plates located at opposite ends of said crystal, said pair of electrodes providing with said shield member, input and output electrodes for said filter, and a movable conductive element located for movement between said condenser plates to vary the couplings between said pair of condenser plates.

2. In a wave filtering system, an alternating current circuit having an input on which wave energy may be impressed, said alternating current circuit having an output from which filtered energy may be taken, a piezo-electric crystal in a shield and holder, combined capacity elements and crystal electrodes at spaced points on said crystal serving with said shield to connect said crystal between the input and output of said alternating current circuit, and variable means in the form of a conductive member movably mounted relative to said capacity elements for off-setting the capacity of said holder of said crystal whereby the neutralization of said filter circuit may be varied from a condition of complete neutralization at which said filter circuit has a characteristic which is symmetrical with respect to wave frequencies on both sides of a selected wave frequency to a condition at which said filter circuit has a characteristic which is unsymmetrical with respect to wave frequencies on opposite sides of said selected wave frequency.

3. A filter circuit of adjustable characteristic comprising, a closure member, a piezo-electric crystal therein, a pair of input terminals associated with said closure member, combined crystal electrodes and capacity elements located at separated points on said crystal, means coupling said capacity elements to said input and output terminals respectively, and an additional capacity element adjustably positioned adjacent at least one of said first capacity elements to form therewith a variable reactance in said filter circuit.

MURRAY G. CROSBY.